(12) United States Patent
Chung et al.

(10) Patent No.: US 8,369,787 B2
(45) Date of Patent: Feb. 5, 2013

(54) APPARATUS AND METHOD OF SWITCHING CHANNEL UNDER WIRELESS NETWORK CIRCUMSTANCES

(75) Inventors: Jin-Joo Chung, Seoul (KR); Dae-Yong Sim, Hwasung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 12/918,404

(22) PCT Filed: Feb. 18, 2009

(86) PCT No.: PCT/KR2009/000750
§ 371 (c)(1),
(2), (4) Date: Aug. 19, 2010

(87) PCT Pub. No.: WO2009/104887
PCT Pub. Date: Aug. 27, 2009

(65) Prior Publication Data
US 2011/0013092 A1    Jan. 20, 2011

(30) Foreign Application Priority Data

Feb. 19, 2008 (KR) .................. 10-2008-0014923

(51) Int. Cl.
*H04L 27/26* (2006.01)
(52) U.S. Cl. .................... 455/62; 455/435.2; 455/435.3; 455/443; 455/446; 455/447; 455/448; 455/450; 455/451; 455/455; 455/509; 455/132; 348/372
(58) Field of Classification Search ............... 455/6, 62, 455/451–452.2; 348/732
See application file for complete search history.

(56) References Cited

U.S. PATENT DOCUMENTS 8,023,956 B2 * 9/2011 Hu ............................ 455/452.1
2006/0176861 A1   8/2006 Schmidt

FOREIGN PATENT DOCUMENTS

WO    2007/052995 A1    5/2007
WO    WO 2007052995 A1 *  5/2007

OTHER PUBLICATIONS

International Search Report (PCT/ISA/210) and Written Opinion (PCT/ISA/237) for PCT/KR2009/000750 of Sep. 25, 2009.
Cordeiro, C., et al. "Cognitive PHY and MAC Layers for Dynamic Spectrum Access and Sharing of TV Bands", Proceedings of the first international workshop on Technology and policy for accessing spectrum, Aug. 2006, pp. 1-10.

* cited by examiner

*Primary Examiner* — Fayyaz Alam
*Assistant Examiner* — Mohammed Rachedine
(74) *Attorney, Agent, or Firm* — Sughrue Mion, PLLC

(57) ABSTRACT

An apparatus and method of switching a channel under wireless network circumstances is provided, which can secure network resources by performing channel switching and channel bonding with an adjacent network if the network resources of the currently participating network are insufficient in performing wireless data communications. The apparatus includes a message analysis unit analyzing at least one received channel information message and confirming whether a channel corresponding to the channel information message and a channel adjacent to the channel are usable, a channel switching unit performing a channel switching with a usable target channel among the channels with reference to whether the confirmed channel and the adjacent channels are usable, in accordance with a result of determining whether network resources of a currently used channel are insufficient, and a channel bonding unit performing a channel bonding between the channel-switched target channel and the adjacent channels.

21 Claims, 7 Drawing Sheets

[Fig. 1]
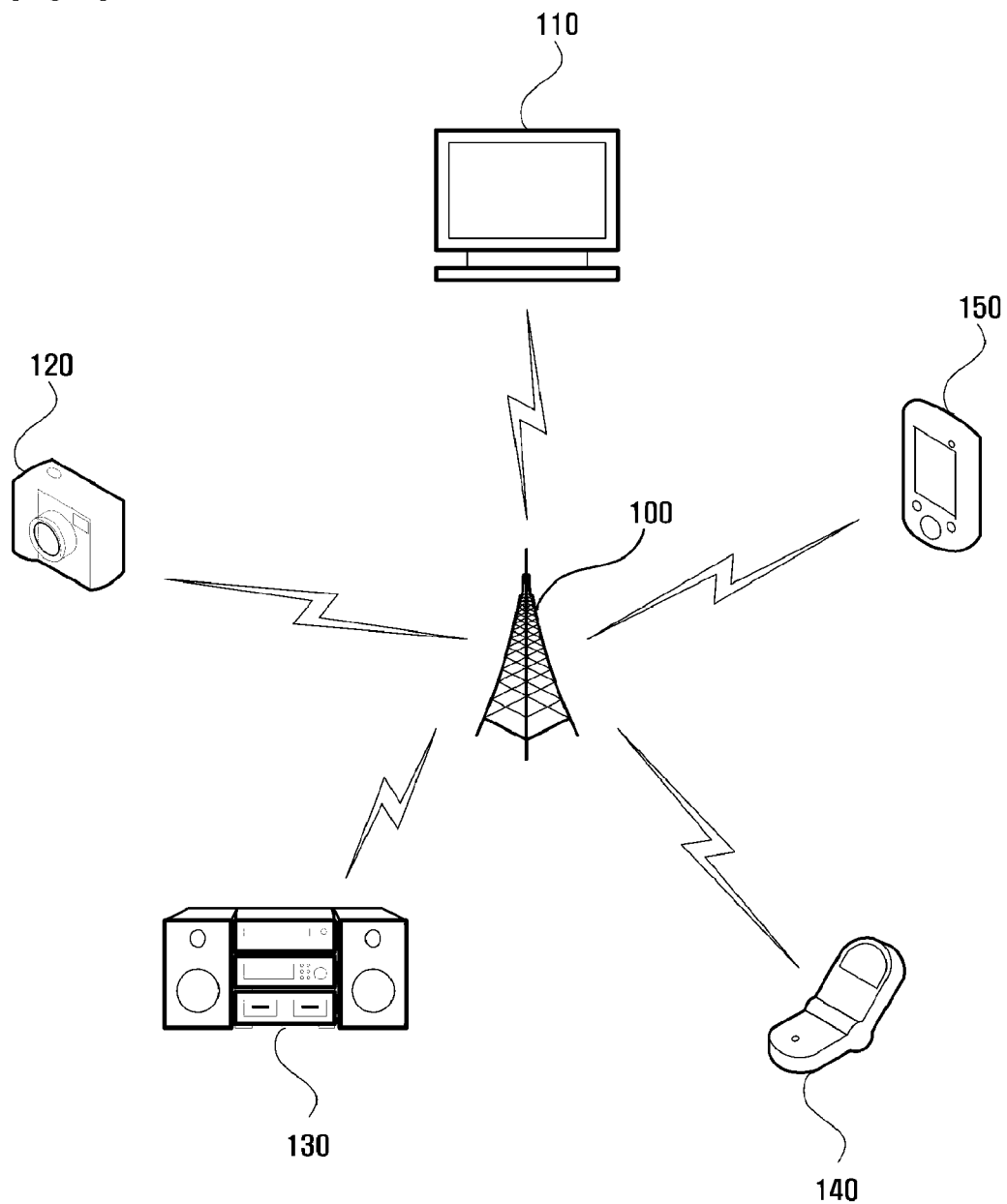

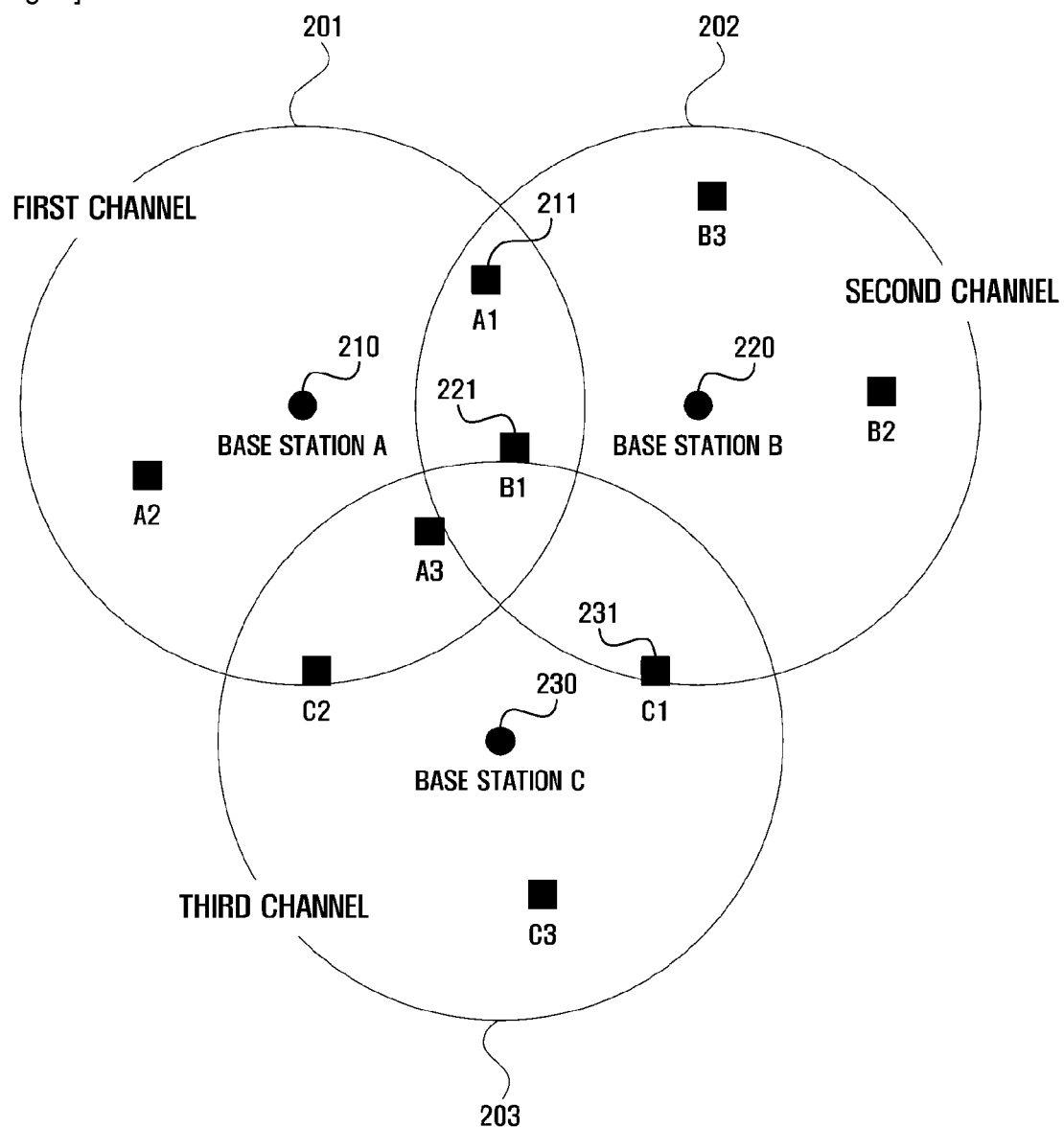
[Fig. 2]

[Fig. 3]
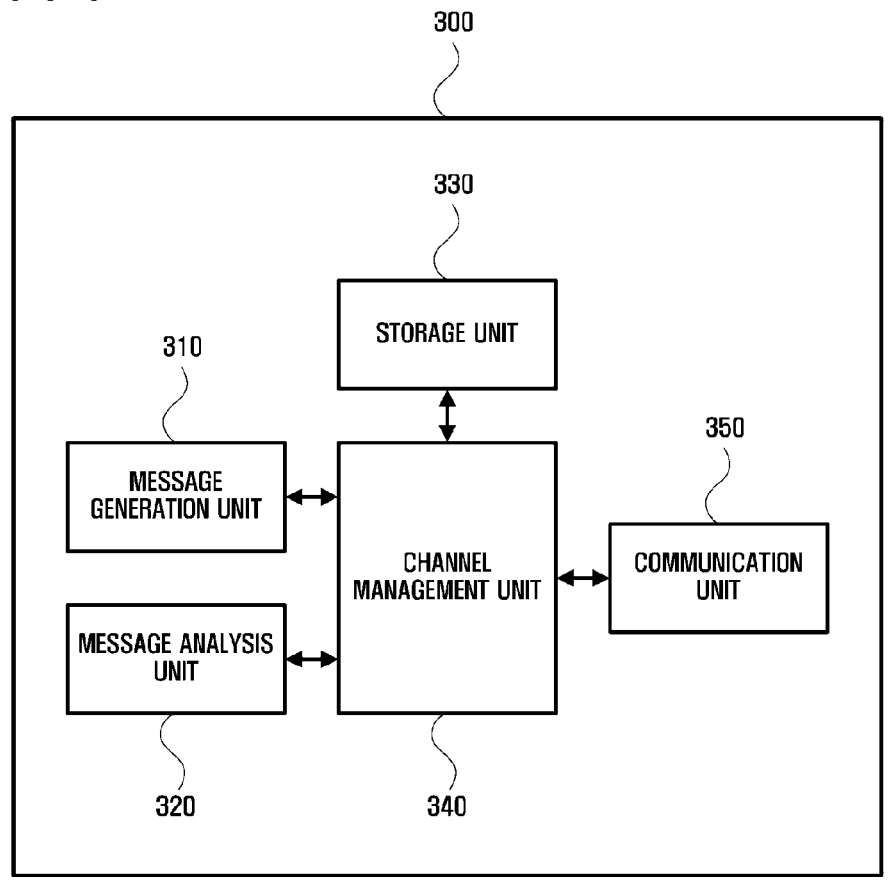
[Fig. 4]
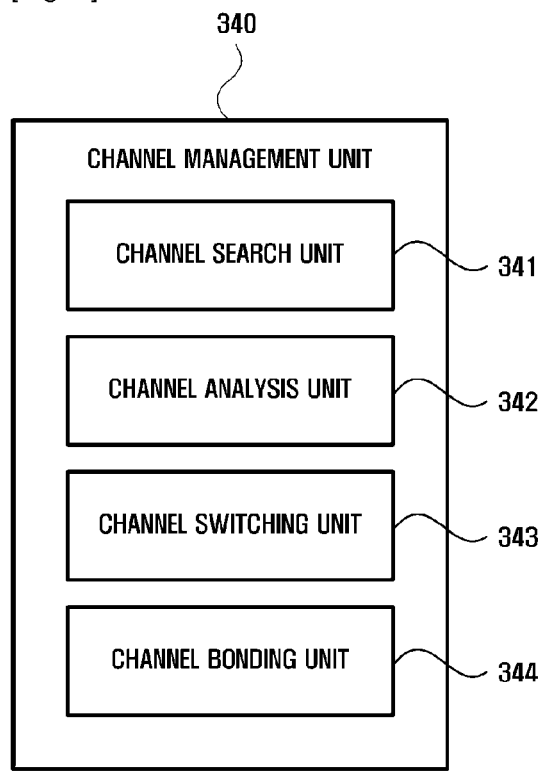

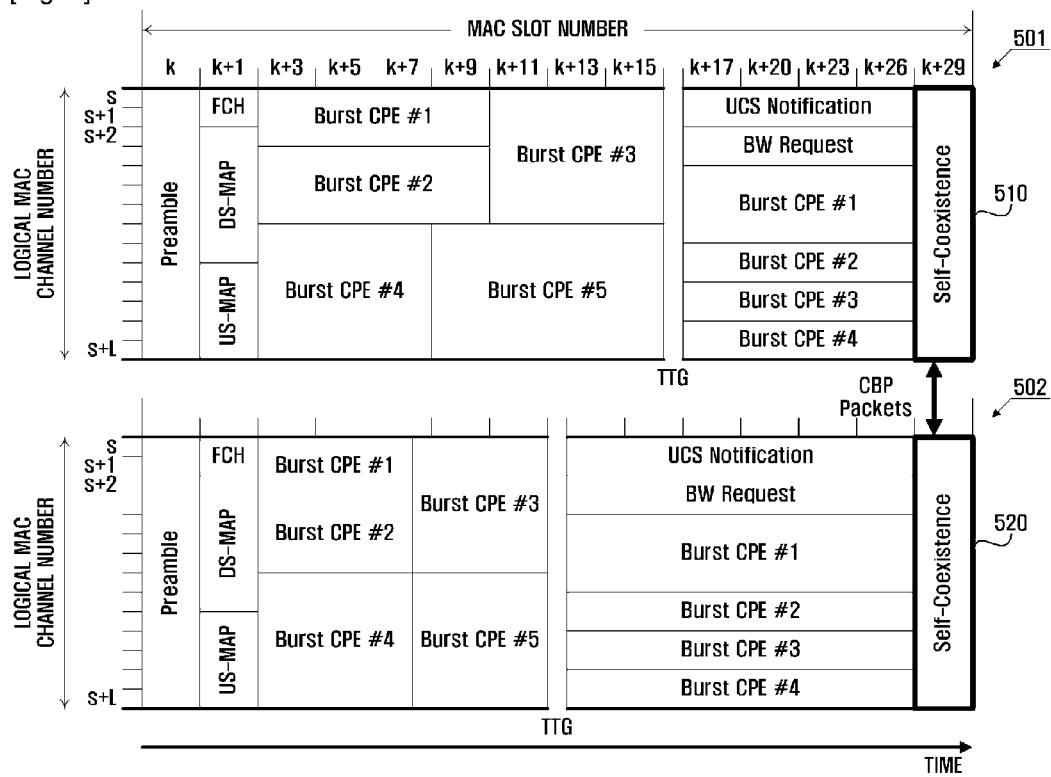
[Fig. 5]

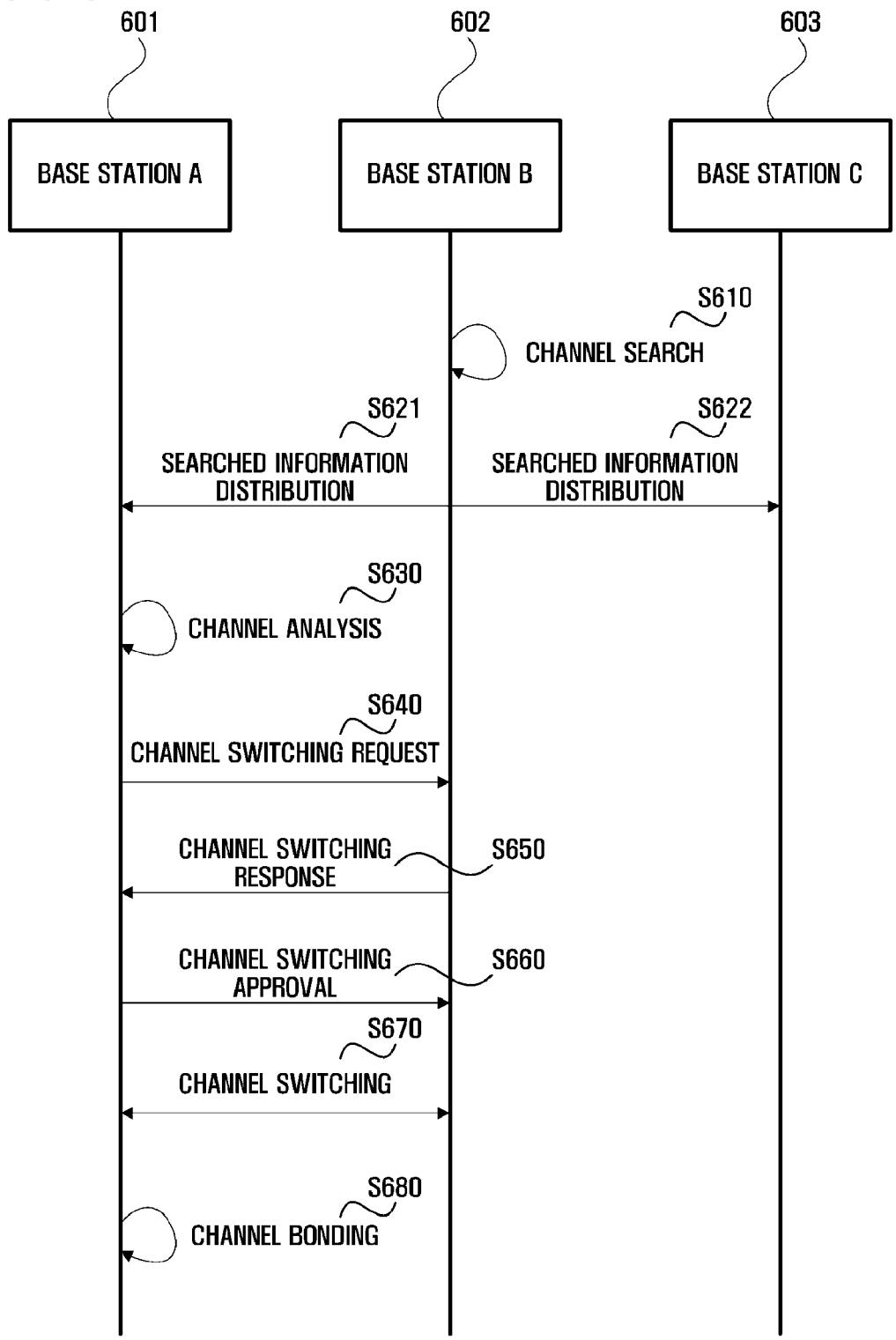

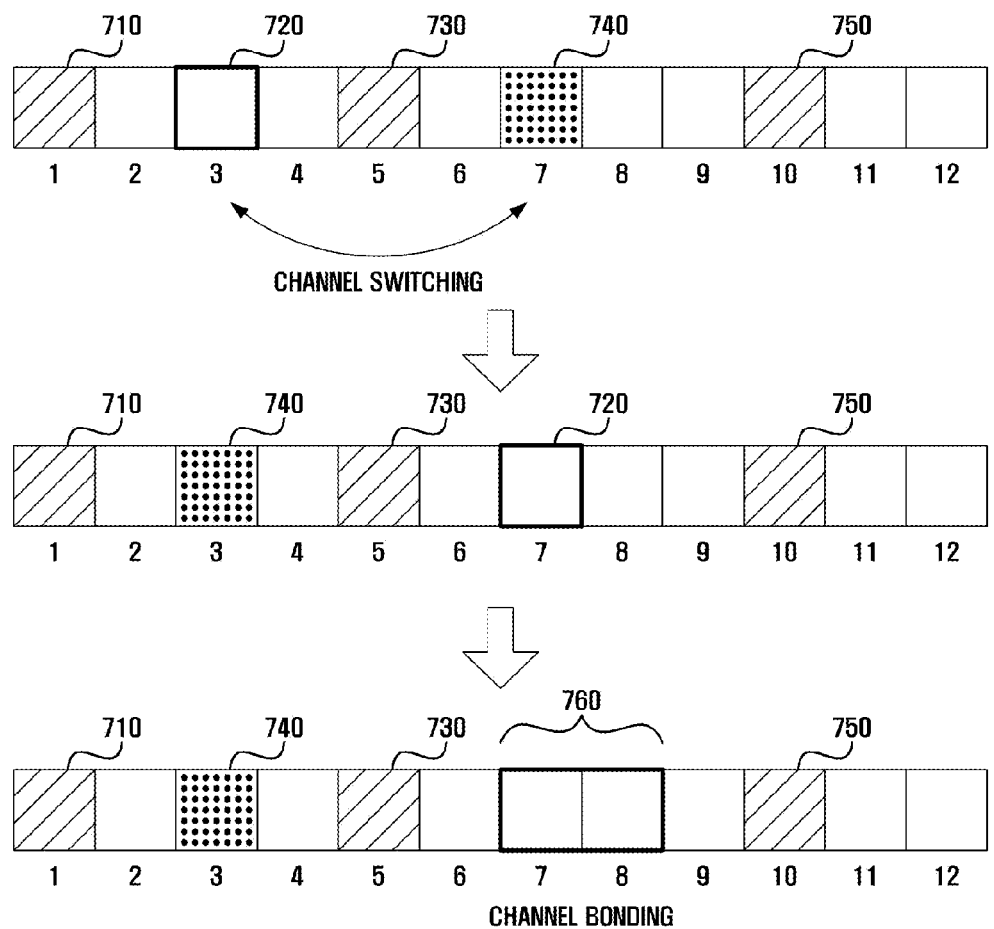

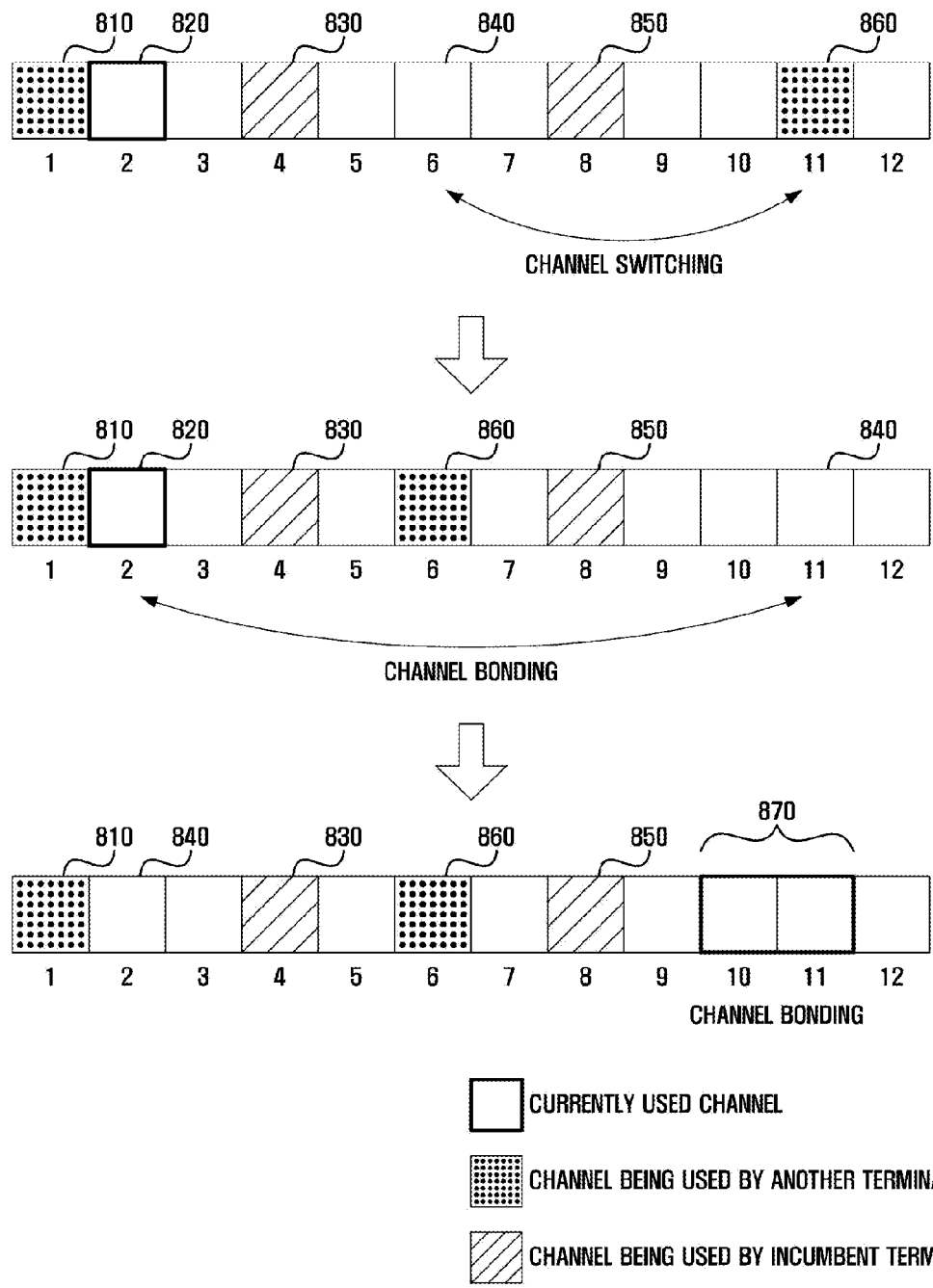

APPARATUS AND METHOD OF SWITCHING CHANNEL UNDER WIRELESS NETWORK CIRCUMSTANCES

CROSS REFERENCE TO RELATED APPLICATIONS

This application is a National Stage application under 35 U.S.C. §371 of PCT/KR2009/000750 filed on Feb. 18, 2009, which claims the benefit of Korean Patent Application No. 10-2008-0014923, filed on Feb. 19, 2008, at the Korean Intellectual Property Office, all the disclosures of which are incorporated herein in their entireties by reference.

FIELD

Apparatuses and methods consistent with the exemplary embodiments relate to switching a channel under wireless network circumstances, and more particularly to an apparatus and method of switching a channel under wireless network circumstances, which can secure network resources by performing channel switching and channel bonding with an adjacent network if the network resources of the currently participating network are insufficient in performing wireless data communications.

DESCRIPTION OF RELATED ART

Wireless devices are limited to operate only in a specified frequency band. The respective band has a related bandwidth, and the bandwidth means a frequency region in the band and is related to the data capacity of a link. It has been proved in mathematics, information theory, signal processing theory, and the like, that much more data can be transmitted as the bandwidth becomes wider. The use of the frequency spectrum must comply with the procedure provided by a concerned regulatory organization. In order to prevent the duplicate use of the frequency, the frequency allocation is made in band, and this means that the frequency range is separately allocated in specified application fields. A wireless network can also be used only in an allocated frequency range, and no permission is required in constructing and operating the wireless network within the frequency range.

With the increase in the kinds and functions of wireless devices, usable frequency bands become insufficient, and interference between the frequency bands is increased. According to the wireless network technology, different frequency bands are used by standards, and the frequency band permitted in the respective standard is managed as a plurality of divided channels. That is, a terminal on a network can transmit or receive data through a specified channel.

On the other hand, as the performance of a device capable of processing data is improved, there is a need for a technique capable of transmitting/receiving large-capacity data. For example, although it is required to transmit/receive high-capacity multimedia data, such as audio and video data, through a wireless network, it may be impossible to smoothly transmit/receive high-capacity data through a single channel.

For this, a channel bonding technique for bonding adjacent channels has appeared. According to the channel bonding technique, if sufficient network resources to transmit data are not secured, data is transmitted/received through a frequency band formed by a plurality of channels obtained by bonding the currently used channel and adjacent channels.

By using the channel bonding technique, large-capacity data can be smoothly transmitted/received. However, if the channel adjacent to the currently used channel is an inaccessible channel or is used by another terminal device, the channel bonding technique cannot be used.

Accordingly, an invention capable of transmitting/receiving data through a plurality of channels is required even though the use of adjacent channels may be limited.

SUMMARY

Accordingly, the exemplary embodiments of the present invention have been made to solve the above-mentioned problems occurring in the prior art, and an object of the exemplary embodiments of the present invention is to provide an apparatus and method of switching a channel under wireless network circumstances, which can secure network resources by performing channel switching and channel bonding with an adjacent network if the network resources of the currently participating network are insufficient in performing wireless data communications.

Additional advantages, objects, and features of the exemplary embodiments of the invention will be set forth in part in the description which follows and in part will become apparent to those having ordinary skill in the art upon examination of the following or may be learned from practice of the exemplary embodiments of the invention.

In order to accomplish these objects, there is provided an apparatus for switching a channel under wireless network circumstances, according to the exemplary embodiments of the present invention, which includes a message analysis unit analyzing at least one received channel information message and confirming whether a channel corresponding to the channel information message and a channel adjacent to the channel are usable; a channel switching unit performing a channel switching with a usable target channel among the channels with reference to whether the confirmed channel and the adjacent channels are usable, in accordance with a result of determining whether network resources of a currently used channel are insufficient; and a channel bonding unit performing a channel bonding between the channel-switched target channel and the adjacent channels.

In another aspect of the exemplary embodiments of the present invention, there is provided a method of switching a channel under wireless network circumstances, which includes analyzing at least one received channel information message and confirming whether a channel corresponding to the channel information message and a channel adjacent to the channel are usable; performing a channel switching with a usable target channel among the channels with reference to whether the confirmed channel and the adjacent channels are usable, in accordance with a result of determining whether network resources of a currently used channel are insufficient; and performing a channel bonding between the channel-switched target channel and the adjacent channels.

BRIEF DESCRIPTION OF THE DRAWINGS

FIG. 1 is a view illustrating a network system between a base station and terminal devices through one channel according to an exemplary embodiment of the present invention;

FIG. 2 is a view explaining the coexistence of a plurality of channels overlapping one another according to an exemplary embodiment of the present invention;

FIG. 3 is a block diagram illustrating the configuration of an apparatus for switching a channel under wireless network circumstances according to an exemplary embodiment of the present invention;

FIG. 4 is a block diagram illustrating the detailed configuration of a channel management unit of FIG. 3;

FIG. 5 is a view explaining a time division frame according to an exemplary embodiment of the present invention;

FIG. 6 is a flowchart illustrating a process of performing a channel bonding according to an exemplary embodiment of the present invention;

FIG. 7 is an exemplary view explaining a channel bonding according to an exemplary embodiment of the present invention; and FIG. 8 is an exemplary view explaining a channel bonding according to another exemplary embodiment of the present invention.

DETAILED DESCRIPTION OF EXEMPLARY EMBODIMENTS

Hereinafter, exemplary embodiments of the present invention will be described in detail with reference to the accompanying drawings. The aspects and features of the exemplary embodiments of the present invention and methods for achieving the aspects and features will be apparent by referring to the exemplary embodiments to be described in detail with reference to the accompanying drawings. However, the present invention are not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the exemplary embodiments of the present invention, the same drawing reference numerals are used for the same elements across various figures.

The term "unit", as used herein, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

FIG. 1 is a view illustrating a network system between a base station and terminals through one channel according to an exemplary embodiment of the present invention.

Terminals 110, 120, 130, 140, and 150 on a network perform communications with a base station 100 to transmit/receive data. That is, a terminal that intends to transmit data transmits the corresponding data to the base station 100, and the base station 100 relays the received data to a target terminal.

In the exemplary embodiment of the present invention, a communication system between the base station 100 and the terminals 110, 120, 130, 140, and 150 includes the IEEE 802.22 wireless regional area network (WRAN), and operates in very high frequency (VHF)/ultra high frequency (UHF) TV bands by using a cognitive radio technology.

The terminals 110, 120, 130, 140, and 150 perform uplink communications for transmitting data to the base station 100, and the base station 100 performs downlink communications for transmitting the data to the terminals 110, 120, 130, 140, and 150. In the exemplary embodiment of the present invention, in order to reduce the peak-to-average power ratio (PAPR) at uplink, an orthogonal frequency division multiple access (OFDMA) is used at the uplink and downlink. On the other hand, a MAC system used in the exemplary embodiment of the present invention is not limited to the OFDMA, but may adopt a time division multiple access (TDMA), code division multiple access (TDMA), carrier sense multiple access (CSMA), or the like.

The terminals 110, 120, 130, 140, and 150 support the use of one TV channel with diverse channel bandwidths up to 8 MHz, and the base station 100 supports the use of a plurality of TV channels which are adjacent to one another or which are not adjacent to one another. To the respective terminals 110, 120, 130, 140, and 150, scalable bandwidths of 1.25 MHz to 7.5 MHz may be allocated.

The uplink and downlink use the OFDMA system of a two-layer structure as a modulation system. The first layer is a layer where an inter-frequency band multiple access is used, and has a frequency band of one TV channel or a frequency band of 6, 7, and 8 MHz. On the other hand, the second layer is a layer where a multiple access in one TV frequency band is used, and one frequency band may be dividedly allocated to a plurality of terminals 110, 120, 130, 140, and 150.

A data unit in the frequency region that is transmitted/received using the OFDMA system is called an OFDMA symbol. The OFDMA system supports that a plurality of terminals simultaneously transmit OFDMA symbols through different subcarriers.

A respective subframe of a conventional OFDMA system based on the TDMA is provided with a plurality of time slots used to transmit or receive the OFDMA symbols. Here, the respective time slot corresponds to the transmission/reception of one OFDMA symbol. The respective terminal is allocated with at least one time slot to transmit/receive the symbol.

FIG. 2 is a view explaining the coexistence of a plurality of channels overlapping one another according to an exemplary embodiment of the present invention.

As shown in FIG. 2, transmission ranges of the first to third channels 201, 202, and 203, which are formed by base station A 210, base station B 220, and base station C 230, respectively, overlap one another.

Terminals included in the respective channel regions communicate with the base stations through corresponding frequency channels to transmit/receive the data.

On the other hand, in the exemplary embodiment of the present invention, the base stations 210, 220, and 230 perform the channel switching and channel bonding by sharing information on adjacent channels. In the transmission range of a channel formed by a base station, other base stations are not included. Accordingly, terminals 211, 221, and 231 existing in overlap regions of the channels relay information among the base stations 210, 220, and 230.

For example, a terminal A1 211 using the first channel 201 is included in the transmission range of the second channel 202, and thus transmits information transferred from the base station A 210 to the base station B 220. For this, the terminal A1 211, which initially uses the first channel 201, performs a channel shifting to the second channel 202 after receiving the information from the base station A 210.

Also, in the exemplary embodiment of the present invention, the base stations 210, 220, and 230 should exchange at least one message for the channel switching and the channel bonding, and the message exchange is performed by the terminals 211, 221, and 231 of the respective channels existing in the overlap regions. For example, if the base station A 210 that intends to perform the channel switching with the base station B 220 transfers a channel switching request message to the terminal A1 211 existing in the overlap region of the first channel 201 and the second channel 202, the terminal A1 211 performs the channel shifting to the second channel to transmit the channel switching request message to the base station B 220 through the second channel 202.

The base station B 220, which has received the channel switching request message, generates and transfers, in response to the received message, a channel switching response message to the terminal B1 221 existing in the overlap region of the first channel 201 and the second channel 202. Accordingly, the terminal B1 221 performs the channel shifting to the first channel 201 and transfers the message to the base station A 210.

As described above, the message exchange between the base stations may be performed by a plurality of terminals existing in the overlap region, and the message relay may be performed through one terminal. That is, the terminal belonging to one channel performs the channel shifting to another channel to transmit the message, receives a message transferred from the base station in the shifted channel in a state that the terminal maintains the shifted channel as it is, rather than performs the channel shifting again to the previous channel, and then performs the channel shifting to the previous channel to transfer the message to the base station in the previous channel.

In FIG. 2, the terminal C1 231 performs a message relay between the base station B 220 and the base station C 230. For example, the terminal C1 231, which has received the channel switching request message from the base station C 230, performs the channel shifting to the second channel 202 and transfers the corresponding message to the base station B 220. Then, the terminal C1 231 waits in the second channel 202 until the channel switching response message is received from the base station B 220, and if the channel switching response message is received, it performs the channel shifting again to the third channel 203 to transfer the corresponding response message to the base station C 230.

In order for one terminal 231 to perform the message relay, the message includes a flag that indicates the kind of message. Accordingly, the terminal, which has transferred a specified message, can determine whether to wait for the response message in the shifted channel or to immediately perform the channel shift to the previous channel.

FIG. 3 is a block diagram illustrating the configuration of an apparatus for switching a channel under wireless network circumstances according to an exemplary embodiment of the present invention.

The channel switching apparatus 300 includes a message generation unit 310, a message analysis unit 320, a storage unit 330, a channel management unit 340, and a communication unit 350. In the exemplary embodiment of the present invention, the channel switching apparatus 300 means an apparatus serving as a base station under wireless network circumstances, and exchanges a message with another channel switching apparatus 300 in an adjacent channel so that channel switching and channel bonding are performed.

The message generation unit 310 serves to generate a message. Here, the message includes a channel information message, a channel switching request message, a channel switching response message, and a channel switching approval message.

In the channel information message, whether the current channel and adjacent channels are usable is indicated. Here, the current channel means a channel formed by the channel switching apparatus 300, and the adjacent channel means a channel having a region overlapping the current channel. In FIG. 2, since the first to third channels have their overlap regions, all channels except for themselves become the adjacent channels.

Information on whether the current channel and the adjacent channels are usable, which is included in the channel information message, may include whether terminals using the current channel and the adjacent channels exist and the transmission state of the terminals.

The channel information message may be periodically generated with updated information on the current channel and the adjacent channel reflected therein, or may be generated only when a usable adjacent channel is generated.

The channel switching request message is generated by the message generation unit 310 of the channel switching apparatus 300 that intends to request the channel switching to the base station in another channel, and includes the current channel number, a channel switching type, a channel switching start time, channel quality information (CQI), and the like.

The channel switching response message is generated by the message generation unit 310 of the channel switching apparatus 300 having received the channel switching request message, and includes a flag that permits the channel switching or a flag that does not permit the channel switching.

If the channel switching is not permitted, the channel switching response message may include the reason why the channel switching is not permitted.

The channel switching approval message is generated by the message generation unit 310 of the channel switching apparatus 300 having received the channel switching response message. As the channel switching approval message is transmitted, the channel switching is performed.

The message analysis unit 320 serves to analyze at least one received channel information message, and to confirm, i.e., determine, whether a channel corresponding to the channel information message and adjacent channels are usable.

The channel information massage is received from at least one base station. The message analysis unit 320 confirms whether a current channel formed by the base station and adjacent channels adjacent to the current channel are usable with reference to the received channel information message.

Here, information on whether the current channel and the adjacent channels are usable may include whether the current channel and the adjacent channels are currently used. That is, if a flag, which indicates that the current channel and the adjacent channels are currently used by the terminals included in the current channel or the corresponding adjacent channels, is included in the channel information message, the message analysis unit 320 determines that the current channel and the adjacent channels are unusable.

In addition, whether the current channel and the adjacent channels are usable may be determined by the quality of the current channel and the adjacent channels, and if the channel quality is poor although the current channel and the adjacent channels are not in use, the message analysis unit 320 determines that the current channel and the adjacent channels are unusable.

In confirming whether the adjacent channels are usable, the message analysis unit 320 determines whether the adjacent channels adjacent to the current channel are usable with reference to the kind of the terminal that is using the channel corresponding to the respective channel information message.

This is to secure the quality of radio wave transmission/reception of the corresponding terminal by limiting the use of the adjacent channels when the terminal that is easily affected by the radio wave interference uses the adjacent channel. In the case where the terminal is a TV, the message analysis unit 320 determines that the adjacent channels adjacent to the current channel currently used by the TV are unusable.

The storage unit 330 serves to store data to be transmitted or received data. The storage unit 330 also serves to temporarily store the channel information message, the channel switching request message, the channel switching response message, and the channel switching approval message.

The storage unit 330 may be implemented by a module that can input/output information, such as a hard disk, a flash memory, a compact flash card (CF card), a secure digital card (SD card), a smart media card (SM card), a multimedia card (MMC), or a memory stick. The storage unit 330 may be provided in the channel switching apparatus 300, or may be provided in a separate apparatus.

The channel management unit 340 determines whether the network resources of the current channel is insufficient, and performs the channel switching and the channel bonding in accordance with the result of the determination.

FIG. 4 is a block diagram illustrating the detailed configuration of the channel management unit 340.

The channel management unit 340 includes a channel search unit 341, a channel analysis unit 342, a channel switching unit 343, and a channel bonding unit 344.

The channel search unit 341 serves to confirm whether the current channel and the adjacent channels are usable. That is, the channel search unit 341 confirms whether the current channel and the adjacent channels are currently used by a terminal. In order to confirm the used state of the current channel, the channel search unit 341 refers to a schedule list for the terminal included in the current channel. Also, in order to confirm the used state of the adjacent channels, the channel search unit 341 refers to the channel information message received from the adjacent channel.

The channel analysis unit 342 serves to determine whether the network resources of the current channel are insufficient. That is, multimedia data, such as audio and video data, of a specified size should be transmitted/received in a specified time, and thus the channel analysis unit 342 confirms whether a frequency band required for transmission/reception of the corresponding data is secured. This can be performed by comparing the frequency band that can be permitted in the current channel with the required transmission capacity per unit time of the corresponding data. Also, the channel analysis unit 342 determines whether the network resources are insufficient in consideration of the quality of the current channel.

In accordance with the result of analysis performed by the channel analysis unit 342, the channel switching unit 343 performs the channel switching by communicating with the base station that is the subject of channel switching with reference to the result of analysis performed by the message analysis unit 320. That is, if the frequency band required to transmit/receive the data is not secured, the channel switching unit 343 performs the channel switching with the base station in the channel having the usable adjacent channels. Here, it is preferable that the channel of the base station that is the subject of channel switching is also usable.

For the channel switching, the channel switching unit 343 exchanges the channel switching request message, the channel switching response message, and the channel switching approval message with the corresponding base station.

The channel switching unit 343 of the channel switching apparatus 300 requesting the channel switching makes the message generation unit 310 generate the channel switching request message and the channel switching approval message, and transmits the corresponding messages to the opposite base station. On the other hand, the channel switching unit 343 of the channel switching apparatus 300 responding to the requested channel switching makes the message generation unit 310 generate channel switching response message, and transmits the corresponding message to the opposite base station.

As the channel switching is performed, the base station and the terminal perform the data transmission/reception through the switched channel.

The channel bonding unit 344 performs the channel bonding between the switched channel and the adjacent channel. Here, the adjacent channel may be understood as a usable adjacent channel in accordance with the result of analysis performed by the message analysis unit 320.

Referring again to FIG. 3, the communication unit 350 serves to transmit or receive the channel information message, the channel switching request message, the channel switching response message, and the channel switching approval message. The communication unit 350 transmits/receives the message by performing communications with the opposite base station, and in this case, the terminal means a terminal existing in the channel overlap region between the corresponding channel and the channel formed by the opposite base station.

FIG. 5 is a view explaining a time division frame according to an exemplary embodiment of the present invention. In FIG. 5, time division frames 501 and 502 in two different channels are shown.

The time division frames 501 and 502 are briefly divided into a downlink subframe and an uplink subframe. The downlink subframe includes a preamble region, a frame control header (FCH) region, an upstream map region, a downstream map region, and a downlink region. The uplink subframe includes a urgent coexistent situation (UCS) notification region, a band request region, an uplink region, and self-coexistence regions 510 and 520. Between the downlink subframe and the uplink subframe, a transmit/receive transition gap (TTG) exists, and during the TTG, the base station performs a mode change from a transmission mode to a reception mode.

The downlink subframe begins with the preamble which is the initial OFDMA symbol occupying all subcarriers and is used for the time synchronization with the terminal, frequency synchronization, and channel measurement.

After the transmission of the preamble symbol, the frame control header is transmitted. The frame control header includes information related to the current frame, such as a bit map of a subchannel in use, an encoding type of a downstream/upstream map, and the size of a downstream/upstream map.

The downstream map includes various information for defining the downlink transmission, and the information included in the downstream map includes an interval between frames, the number of frames, an identifier of a base station, an offset between a subchannel and an OFDMA symbol, identifiers of respective connections, an encoding type, and a modulation type.

A UCS notification packet transmitted by the terminal in the UCS notification region is used to notify whether the terminal using the current channel is a device of which the quality of radio wave transmission/reception should be secured such as a TV (hereinafter referred to as a "incumbent terminal"), and the band request region is used to transmit/receive a message for band allocation and approval between the terminal and the base station.

If a new base station is added in a TDMA or OFDMA network system, the time synchronization is performed between the new base station and the existing base station. That is, as illustrated in FIG. 5, according to the time division frames 501 and 502 by the base stations in different channels, the downlink region and the uplink region are differently formed, but the self-coexistence regions 510 and 520 have the same start. Accordingly, the base stations can perform time and frequency synchronization with each other by transmitting/receiving coexistence beacon protocol (CBP) packets to/from each other, and thus can perform mutual communications with each other.

For example, when the base station A in the first channel intends to communicate with the base station B in the second channel, it transfers, in a downlink region of the n-th time division frame, a message to be transferred to the base station B and channel information of the base station B to the terminal A in the first channel, and the terminal A, at the start point of the self-coexistence region of the n-th time division frame, performs the channel shifting to the second channel, acquires a transmission authority through competition with the terminal in the second channel, and then transfers the message received from the base station A to the base station B.

The base station B, having received the message, transfers, in the downlink region of the (n+1)-th time division frame, the message to be transferred to the base station A and the channel information of the base station A to the terminal B in the second channel. Accordingly, the terminal B, at the start point of the self-coexistence region of the (n+1)-th time division frame, performs the channel shifting to the first channel, acquires the transmission authority through competition with the terminal in the first channel, and then transfers the message received from the base station B to the base station A.

FIG. 6 is a flowchart illustrating a process of performing a channel bonding according to an exemplary embodiment of the present invention.

First, the base station B 602 confirms whether the channel to which the base station B itself belongs and the adjacent channels are usable through a channel search (S610), and distributes the result of confirmation to the base station A 601 and the base station C 603 (S621 and S622).

The base station A 601 and the base station C 603 store the information transferred from the base station B 602, and if data to be transmitted/received is generated, it performs the channel analysis. FIG. 6 shows that the base station A 601 performs the channel analysis (S630) as the data to be transmitted/received is generated.

If it is determined that the network resources are insufficient to transmit/received data as a result of channel analysis, the base station A 601 transmits the channel switching request message to the base station B 602 (S640). The base station B, having received the channel switching request message, transmits the channel switching response message to the base station A 601 (S650).

In FIG. 6, it is exemplified that the channel switching response message for permitting the channel switching is transmitted, and thus the base station A 601 performs the channel switching with the base station B (S670) by transmitting the channel switching approval message (S660).

If the channel switching is completed, the base station A 601 performs channel bonding between the switched channel and the adjacent channels (S680). Through this channel bonding, the base station A 601 can secure the network resources, and smoothly performs the data transmission/reception.

FIG. 7 is an exemplary view explaining a channel bonding according to an exemplary embodiment of the present invention. In FIG. 7, channel 1 710, channel 5 730, and channel 10 750 are being used by the incumbent terminal, channel 7 740 is being used by another terminal, and channel 3 is the currently used channel.

Since channel 1 710, channel 5 730, and channel 10 750 are being used by the incumbent terminal, the use of their adjacent channels, i.e. channel 2, channel 4, channel 6, channel 9, and channel 11, is limited.

On the other hand, since channel 8 adjacent to channel 7 740 is not in use, the base station of channel 3 720 performs the channel switching with the base station of channel 7 740, and performs the channel bonding between the switched channel and channel 8.

FIG. 8 is an exemplary view explaining a channel bonding according to another exemplary embodiment of the present invention. In FIG. 8, channel 4 830 and channel 8 850 are being used by the incumbent terminal, channel 1 810 and channel 11 860 are being used by another terminal, and channel 2 820 is the currently used channel.

Since channel 4 830 and channel 8 850 are being used by the incumbent terminal, the use of their adjacent channels, i.e. channel 3, channel 5, channel 7, and channel 9, is limited. Accordingly, even if the base station in channel 2 820 performs the channel switching with channel 6 840 that is not in use, the channel bonding with channel 5 or channel 7 cannot be performed.

On the other hand, since channel 10 and channel 12 are not in use, the base station in channel 2 820 can perform the channel switching with the base station in channel 11 860. However, if such channel switching is performed, the base station in channel 11 860, which has performed the channel switching to channel 2 820, becomes adjacent to channel 1 810, and thus the radio wave interference may occur.

Accordingly, the base station of channel 2 820 requests the base station in channel 11 860 to perform the channel sifting to channel 6 840, and if the channel 11 860 is not in use, it performs the channel switching with the base station in channel 11 860 and performs the channel bonding between the switched channel 11 and channel 10 or 12. FIG. 8 shows that the channel bonding between the switched channel and channel 10 is performed.

In accordance with the channel switching and the channel bonding as described above, the base stations in all the channels can prevent the occurrence of interference with adjacent channels, and the base station in the current channel can transmit/receive data through the bonded channel 870.

Although exemplary embodiments of the present invention have been described for illustrative purposes, those skilled in the art will appreciate that various modifications, additions and substitutions are possible, without departing from the scope and spirit of the invention as disclosed in the accompanying claims.

As described above, the apparatus and method of switching a channel under wireless network circumstances according to the exemplary embodiments of the present invention can secure network resources and provide smooth wireless communications by performing the channel switching and the channel bonding with an adjacent network if the network resources of the currently participating network are insufficient in performing wireless data communications.

The invention claimed is:

1. An apparatus for switching a channel to communicate with a terminal in wireless network circumstances, comprising:
a message analysis unit which analyzes a received channel information message and determines whether a first channel of a plurality of channels corresponding to the channel information message and a second channel of the plurality of channels adjacent to the first channel are usable;
a channel switching unit which performs a channel switching of the first channel to a usable target channel among the plurality of channels with reference to whether the first and the second channels are usable and with reference to a result of determining whether network resources of the first channel are insufficient; and
a channel bonding unit which performs a channel bonding between the usable target channel and a channel adjacent to the usable target channel after the channel switching occurs,
wherein at least one of the message analysis unit, the channel switching unit, and the channel bonding unit includes a hardware circuit.

2. The apparatus of claim 1, wherein information on whether the first and the second channels are usable includes information indicating whether the first and the second channels are currently in use.

3. The apparatus of claim 1, wherein the message analysis unit determines whether the second channel adjacent to the first channel is usable with a kind of the terminal based on the channel information message, and the message analysis unit includes the hardware circuit.

4. The apparatus of claim 3, wherein if the terminal is a TV, the message analysis unit determines that the second channel adjacent to the first channel currently used by the TV, is not available.

5. The apparatus of claim 1, wherein the channel information message is relayed by terminal existing in an overlapping region of the first channel and the usable target channel.

6. The apparatus of claim 1, wherein the channel switching unit performs channel switching by receiving the message for the channel switching from a base station of the usable target channel, and the channel switching unit includes the hardware circuit.

7. The apparatus of claim 6, wherein the message for the channel switching includes at least one of a channel switching request message, a channel switching response message, and a channel switching approval message.

8. The apparatus of claim 7, wherein the channel switching request message and the channel switching approval message are transmitted to the base station as the terminal included in a transmission range of the first channel performs channel shifting to the usable target channel.

9. The apparatus of claim 7, wherein the channel switching response message is received as the terminal included in a transmission range of the usable target channel performs channel shifting to the first channel.

10. The apparatus of claim 7, wherein the channel information message, the channel switching request message, the channel switching response message, and a channel switching approval message are transmitted or received in a specified time period synchronized with a base station.

11. A method of switching a channel under wireless network circumstances, comprising:
analyzing a received channel information message and determining whether a first channel corresponding to the channel information message and a second channel adjacent to the channel are usable;
performing a channel switching of the first channel to a usable target channel among a plurality of channels with reference to whether the first and the second channels are usable and with reference to a result of determining whether network resources of the first channel are insufficient; and
performing a channel bonding between the usable target channel and a channel adjacent to the usable target channel after the channel switching occurs.

12. The method of claim 11, wherein information on whether the first and the second channels are usable includes information indicating whether the first and the second channels are currently in use.

13. The method of claim 11, wherein the determining comprises determining whether the second channel adjacent to the first channel is usable with reference to a kind of the terminal based on to the channel information message.

14. The method of claim 13, wherein the confirming comprises determining that the use of the adjacent channels adjacent to the channel currently used by a TV is impossible if the terminal is the TV.

15. The method of claim 11, wherein the channel information message generated by a base station of the channel is relayed by a terminal existing in an overlapping region of the first channel and the usable target channel.

16. The method of claim 11, wherein the performing the channel switching comprises performing the channel switching by receiving the message for the channel switching from a base station of the usable target channel.

17. The method of claim 16, wherein the message for the channel switching includes at least one of a channel switching request message, a channel switching response message, and a channel switching approval message.

18. The method of claim 17, wherein the channel switching request message and the channel switching approval message are transmitted to the base station as the terminal included in a transmission range of the first channel performs channel shifting to the usable target channel.

19. The method of claim 17, wherein the channel switching response message is received as the terminal included in a transmission range of the usable target channel performs channel shifting to the first channel.

20. The method of claim 17, wherein the channel information message, the channel switching request message, the channel switching response message, and a channel switching approval message are transmitted or received in a specified time period synchronized with a base station.

21. The apparatus of claim 1, wherein the channel switching unit performs the channel switching of the first channel to the usable target channel by:
first, channel switching a third channel of the plurality of channels to the usable target channel; and
then, channel switching the first channel to the switched usable target channel.

* * * * *